United States Patent [19]

Muramatsu et al.

[11] Patent Number: 5,592,463
[45] Date of Patent: Jan. 7, 1997

[54] APPARATUS FOR AND METHOD FOR DETERMINING OPTIMUM POWER FOR RECORDING INFORMATION ON RECORDABLE OPTICAL DISC

[75] Inventors: Eiji Muramatsu; Akiyoshi Inoue; Shoji Taniguchi; Hiroyuki Takahashi, all of Tokorozawa; Shigenori Murakami; Toshihiko Takishita, both of Koufu, all of Japan

[73] Assignee: Pioneer Electronic Corporation, Tokyo, Japan

[21] Appl. No.: 299,046

[22] Filed: Aug. 31, 1994

[30] Foreign Application Priority Data

Sep. 3, 1993 [JP] Japan ................... 5-220323

[51] Int. Cl.$^6$ ................................... G11B 7/24
[52] U.S. Cl. .................. 369/275.2; 369/280; 369/50; 369/54
[58] Field of Search .................. 369/275.2, 275.3, 369/100, 112, 114, 116, 280, 50, 58, 32, 47, 54, 189, 13; 360/114, 73.08, 73.02

[56] References Cited

U.S. PATENT DOCUMENTS

| | | | |
|---|---|---|---|
| 5,093,820 | 3/1992 | Maeda et al. | 369/50 |
| 5,109,369 | 4/1992 | Maeda et al. | 369/50 |
| 5,276,670 | 1/1994 | Nogami et al. | 369/116 |
| 5,343,452 | 8/1994 | Maeda et al. | 369/32 |

FOREIGN PATENT DOCUMENTS

| | | |
|---|---|---|
| 0487294 | 5/1992 | European Pat. Off. . |
| 4220694 | 1/1993 | Germany . |

*Primary Examiner*—Ali Neyzari
*Attorney, Agent, or Firm*—Kane, Dalsimer, Sullivan, Kurucz, Levy, Eisele and Richard, LLP

[57] ABSTRACT

An apparatus for recording information on a recordable optical disc by applying a light beam on the surface thereof, the disc includes a first recording area on which information is recorded and reproduced while the disc is rotated at a first linear velocity; and a second recording area on which information is recorded and reproduced while the disc is rotated at a second linear velocity. The first recording area includes a test recording area. The apparatus includes recording power determining unit for determining first optimum recording power for recording information on the first area by a test recording utilizing the test recording area, and for determining second optimum recording power for recording information on the second area by multiplying the first optimum recording power by a predetermined constant.

6 Claims, 7 Drawing Sheets

|  | PCA, PMA | LEAD-IN AREA | PROGRAM AREA | LEAD-OUT AREA |
|---|---|---|---|---|
| RADIUS FROM DISC CENTER (mm) | 22.35 ~23 | 23~25 | 25~58 | 58~59 |

| RADIUS FROM DISC CENTER (mm) | LEAD-IN AREA | PROGRAM AREA | LEAD-OUT AREA |
|---|---|---|---|
| 1st RECORDING AREA (CD FORMAT) | 23 OR LESS ~25 | 25~37 (MAX) | 37~37.5 |
| 2nd RECORDING AREA (LD FORMAT) | 37.5~39 | 39~58 (MAX) | PROGRAM AREA +1 |

APPARATUS FOR AND METHOD FOR DETERMINING OPTIMUM POWER FOR RECORDING INFORMATION ON RECORDABLE OPTICAL DISC

BACKGROUND OF THE INVENTION

1. Field of the Invention

The present invention relates to apparatus for and method of recording information on recordable optical disc, and more particularly to apparatus for and method of recording information which are suitable for recording signal according to CDV (Compact Disc Video) format.

2. Description of the Prior Art

Conventionally, there is CD (Compact Disc), known as a media for reproduction only, on which music information is recorded. There has recently been developed a recordable compact disc (CD-R: Recordable Compact Disc). Recording format of CD-R is generally referred to as "Orange Book", and it is in conformity with recording format of CD. FIGS. 1A and 1B illustrate physical format of CD-R. In CD-R, a lead-in area 4, a program area 5 and a lead-out area 6 are formed from inner circumference of the disc to outer circumference thereof, like the format of CD. In addition, in CD-R, a PCA (Power Calibration Area) 2 and a PMA (Power Memory Area) 3 are provided radially inwardly of the lead-in area 4, as illustrated in FIG. 1.

Recording track on the R-CD is provided with guide groove that is wobbled by the frequency of a carrier of 22.05 kHz which is frequency-modulated by data indicating absolute time information (ATIP: Absolute Time In Pregroove). A laser beam for recording desired information is moved to follow the guide grooves under tracking servo control, and rotational speed of spindle motor which rotates the R-CD is controlled so that the wobbling guide groove pattern has a central frequency of 22.05 kHz. In this manner, tracking servo and spindle-motor servo controls can be effected on unrecorded R-CDs as well as recorded R-CDs.

The PCA 2 is an area where test recording is carried out prior to an actual information recording process, so that the power of the recording laser beam will be optimized for recording desired information in the information recording process. The PCA 2 is composed of a count area and a test area. The count area has a plurality of subareas corresponding respectively to a plurality of subareas of the test area, and each containing a suitable EFM signal recorded therein. Test recording for measuring an optimum recording laser beam power is carried out in the subareas of the test area. One of the subareas of the test area is consumed by a single test recording.

Any subarea of the test area which has once been used by test recording is not available for a next test recording. It is therefore necessary to search for an unused subarea positioned radially inwardly of the used subarea for use in the next test recording. The count area is provided to facilitate the searching process. More specifically, if suitable EFM signals have been recorded in certain subareas of the count area and no EFM signal has been recorded in a subarea next to those subareas, then unrecorded subarea indicates that the corresponding subarea of the test area is available for test recording. Consequently, that corresponding subarea of the test area may be searched for and test recording carried out therein for measuring an optimum recording laser beam power. After an optimum recording laser beam power has been measured in the subarea of the test area, the corresponding subarea of the count area is searched for, and a certain signal (EFM signal) is recorded in that subarea, indicating that test recording has already been conducted in the subarea of the count area.

The PMA 3 is an area for storing a recording history of information successively recorded in the program area. Specifically, start addresses and end addresses of track numbers recorded in the program area, for example, are recorded in the PMA 3 in the same format as the TOC information in the lead-in area.

The recording history of successively recorded information is stored in the PMA 3 for the following reasons: On a partially recorded disc, information may further be recorded in the remaining blank of the program area. Therefore, the information in the PMA 3 cannot be recorded in the lead-in area 4 until the completion of recording of all the desired information is finally indicated. Consequently, information about the tracks that have already been recorded is temporarily stored in the PMA 3. When the user or controller of the disc indicates that no more information will be recorded, the TOC information and a lead-out signal are recorded for the first time. At the time the recording is completed, the TOC information in the PMA 3 is transferred to the lead-in area 4 a plurality of times for improving reliability. The finalized disc (CD-R), on which the recording of all the necessary information is completed, is now in conformity with the CD format, and can be played back by an ordinary playback-only disc player which does not have an ATIP decoder for decoding the ATIP information.

Not only the above-mentioned "Orange Book" but Japanese Patent Applications Nos. 3-23595 and 3-193218 disclose details of recording format of CD-R.

On the other hand, there is CDV (Compact Disc Video), known as application media of CD, which utilizes format of CD and LD (Laser Disc) in combination so as to record both audio and video signals on a unique disc. FIGS. 2A and 2B illustrate basic format of CDV. The CDV roughly includes an audio signal recording area positioned at inner circumferential portion of the disc for recording digital audio information and a video signal recording area positioned at outer circumferential portion of the disc for recording digital audio information and video information. The audio signal recording area includes a first lead-in area 11, a first program area 12 and a first lead-out area 13, and digital audio information for approximately 20 minutes is recorded according to the same format as CD. The video signal recording area includes a second lead-in area 14, a second program area 15 and a second lead-out area 16, and video information and digital audio information for approximately 5 minutes is recorded according to the same format as LD. However, when CDV-format signal is actually recorded on the CD-R, a problem in respect to power of recording light beam takes place due to difference of linear velocity of disc rotation between the audio signal recording area and the video signal recording area. As mentioned above, in CD-R, test recording is performed in the PCA to optimize power of recording light beam. Here, it is assumed that CD-R is divided into a first area (audio signal recording area) and a second area (video signal recording area), and CDV-format signal is recorded on the respective areas. In this case, audio signal is recorded on the first area by linear velocity of 1.2–1.4 m/s according to CD format, and therefore optimum recording power determined by the test recording that is conducted in the PCA positioned at inner circumference of the disc is used for recording, and information pits are accurately formed. However, in the second area of CDV format, linear velocity of disc rotation is 11–12 m/s, approximately 8 times of that in the first area, because video signal to be recorded has broad frequency band. Therefore, if information is recorded by the optimum recording power that is determined by the test recording in the PCA where disc is rotated at linear velocity 1.2–1.4 m/s, recording power becomes relatively insufficient because linear velocity of disc rotation in the second area is much higher than that in the first area. This results in inaccurate or insufficient formation of information pits. Accordingly, in order to perform accurate recording in the second area, it is necessary to determine recording power to be appropriate for the linear velocity of 11–12 m/s. However, if test recording is performed under the linear velocity of 11–12 m/s in the PCA which is positioned most inner circumference of the disc, the disc has to be rotated at rotation frequency nearly 4000–5000 rpm. However, under such a high rotation, in actual, servo control may be unstable and therefore accurate test recording cannot be carried out.

SUMMARY OF THE INVENTION

It is an object of the present invention to provide apparatus for and method of recording information on a recordable optical disc which are capable of recording information, in video information recording area, by optimum recording power determined in accordance with linear velocity of disc rotation.

According to one aspect of the present invention, there is provided an apparatus for recording information on a recordable optical disc by applying a light beam on the surface thereof. The disc includes a first recording area on which information is recorded and reproduced while the disc is rotated at a first linear velocity; and a second recording area on which information is recorded and reproduced while the disc is rotated at a second linear velocity. The first recording area includes a test recording area. The apparatus includes recording power determining unit for determining first optimum recording power for recording information on the first area by a test recording utilizing the test recording area, and for determining second optimum recording power for recording information on the second area by multiplying the first optimum recording power by a predetermined constant.

According to another aspect of the present invention, there is provided a method of recording information on a recordable optical disc by applying a light beam on the surface thereof. The disc includes a first recording area and a second recording area, and the first recording area includes a test recording area. The method includes the steps of: rotating the disc at first linear velocity and determining a first optimum recording power for recording information on the first area by a test recording utilizing the test recording area; recording information on the first recording area by the first optimum recording power while the disc is rotated at the first linear velocity; determining second optimum recording power for recording information on the second area by multiplying the first optimum recording power by a predetermined constant; and recording information on the second recording area by the second optimum recording power while the disc is rotated at the second linear velocity.

According to the present invention, recording area of CD-R is divided into a first recording area and a second recording area, and audio and video information are record in the areas according to CDV-format. Here, a first optimum recording power for the first recording area is determined by a test recording carried out within the PCA, and a second optimum recording power for the second area is determined by multiplying the first optimum recording power by a predetermined constant. As a result, suitable information pits may be formed and information may be accurately recorded.

DETAILED DESCRIPTION OF THE PREFERRED EMBODIMENT

A preferred embodiment of the present invention will be described below with reference to the accompanying drawings.

Fundamental Concept

Figures 1A, 1B:
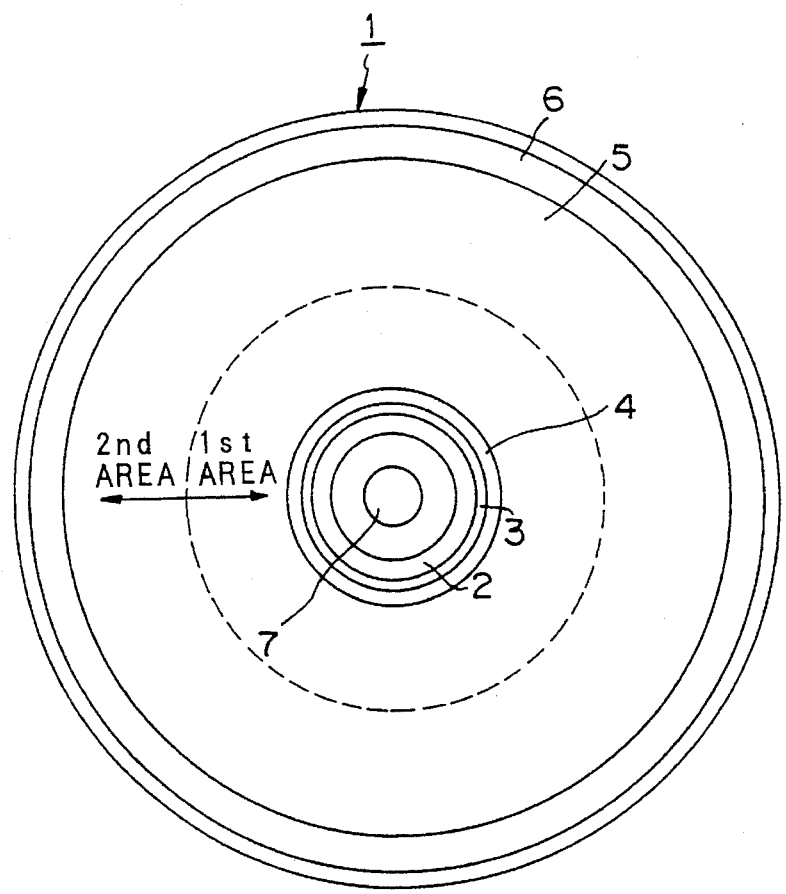
FIGS. 1A and 1B illustrate physical recording format of CD-R.
Figures 2A, 2B:
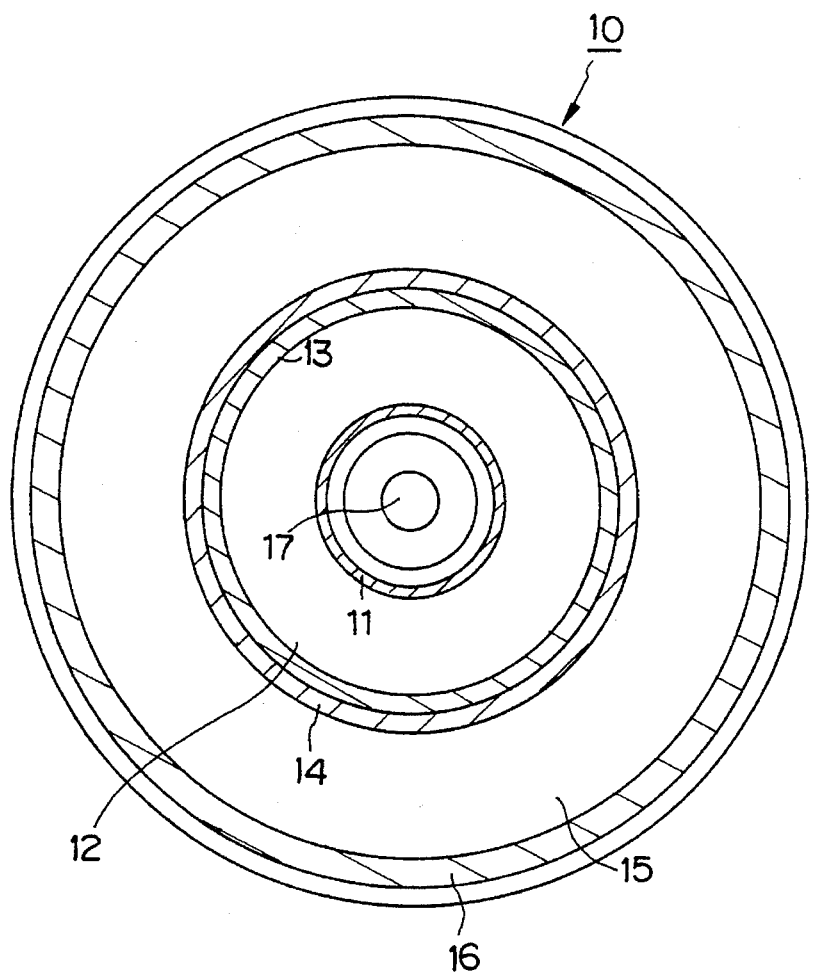
FIGS. 2A and 2B illustrate basic recording format of CDV.

In the present invention, audio signal and video signal are recorded on a CD-R shown in FIG. 1A according to CDV-format shown in FIG. 2A. The recording area of CD-R is divided into a first area positioned inner circumferential side of the disc and a second area positioned outer circumferential side of the disc, as illustrated by the dotted line in FIG. 1A. Based on recording format of CDV, audio signal is recorded in the first area according to CD-format while video and audio signal are recorded in the second area according to LD-format. In the present invention, when audio and video signal according to CDV-format is recorded on CD-R, difference of linear velocities between the first area in which audio signal is recorded and the second area in which video signal is recorded is taken into consideration for determining optimum recording power. Namely, optimum recording power of the second area is determined by multiplying optimum recording power of the first area by a predetermined constant. Details of determining optimum recording power will be described below, starting from an examination of the relation between optimum recording power and linear velocity of disc rotation.

Figure 3:
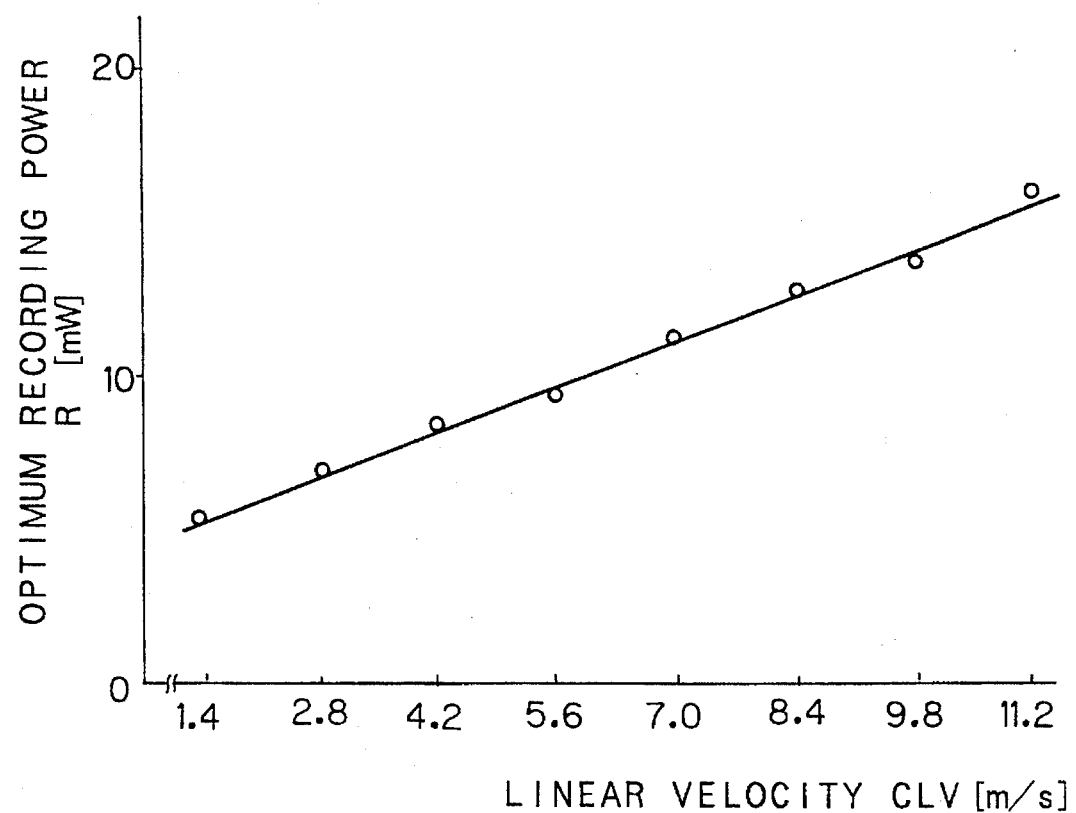
FIG. 3 is a diagram illustrating a relation between linear velocity of disc rotation in recording process and an optimum recording power.

FIG. 3 illustrates the relation between linear velocity of disc rotation in recording process and optimum recording power. As is apparent from FIG. 3, as the linear velocity of disc rotation is increased, an optimum recording power, that is power of light beam required for forming appropriate information pit, has to be increased accordingly. FIG. 3 illustrates a relation between linear velocity of disc rotation and optimum recording power obtained from an experiment using a certain CD-R. From this, it is clear that the optimum recording power is substantially in proportion to the linear velocity of disc rotation. Accordingly, if a first linear velocity is expressed as "$CLV_1$", a second linear velocity is expressed as "$CLV_2$", a first optimum recording power is expressed as "$P_1$" and a second optimum recording power is expressed as "$P_2$", the following equation is satisfied:

$$K = P_2/P_1 \quad (1)$$

Figure 4:
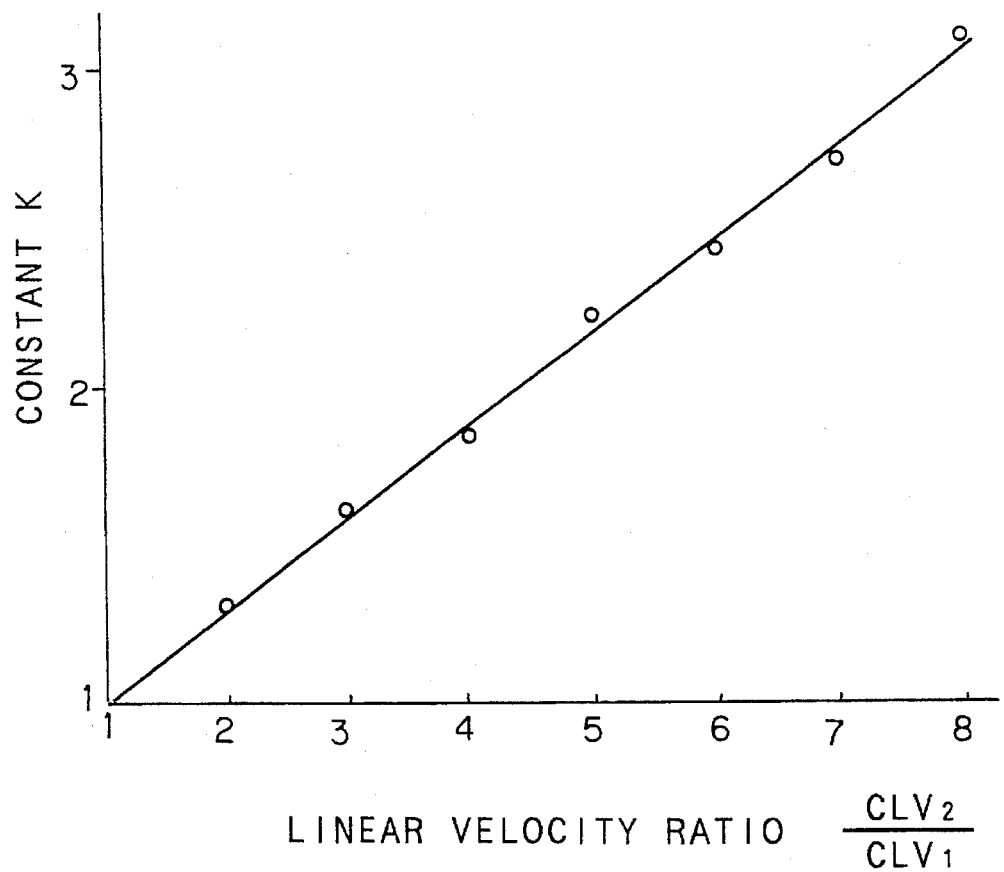
FIG. 4 is a diagram illustrating a relation between a linear velocity ratio and a constant k.

For example, with reference to FIG. 3, if the first linear velocity is 1.4 m/s and the second linear velocity is 11.2 m/s, the constant K obtained from the equation (1) is approximately 2.85. FIG. 4 illustrates a relation between linear velocity ratio ($CLV_2/CLV_1$) and the constant K obtained by fixing the first linear velocity $CLV_1$ to 1.4 m/s and varying the second linear velocity $CLV_2$. From FIG. 4, it is also clear that the constant K is in proportion to the linear velocity ratio ($CLV_2/CLV_1$). Accordingly, if proportional factor is expressed as "α", the following equation is satisfied:

$$K = P_2/P^1 = \alpha \cdot (CLV_2/CLV_1)^n \quad (2)$$

Accordingly, if the first linear velocity and the second linear velocity are determined, the constant K is obtained from the equation (2). Further, if the first optimum recording power $P_1$ is determined, optimum recording powers suitable for various linear velocities can be obtained using the constant K thus obtained. It is confirmed from experiments that the value n is near ½. Among same CD-Rs, dependencies of recording sensitivity to linear velocity are different, and therefore this value ½ is not necessarily applicable to all cases. However, since it is confirmed that the optimum recording power and the linear velocity are in proportion, optimum recording power for various linear velocities may be calculated when the constant K is correctly determined from results of experiments.

CDV-R Recording Apparatus

Figure 5:
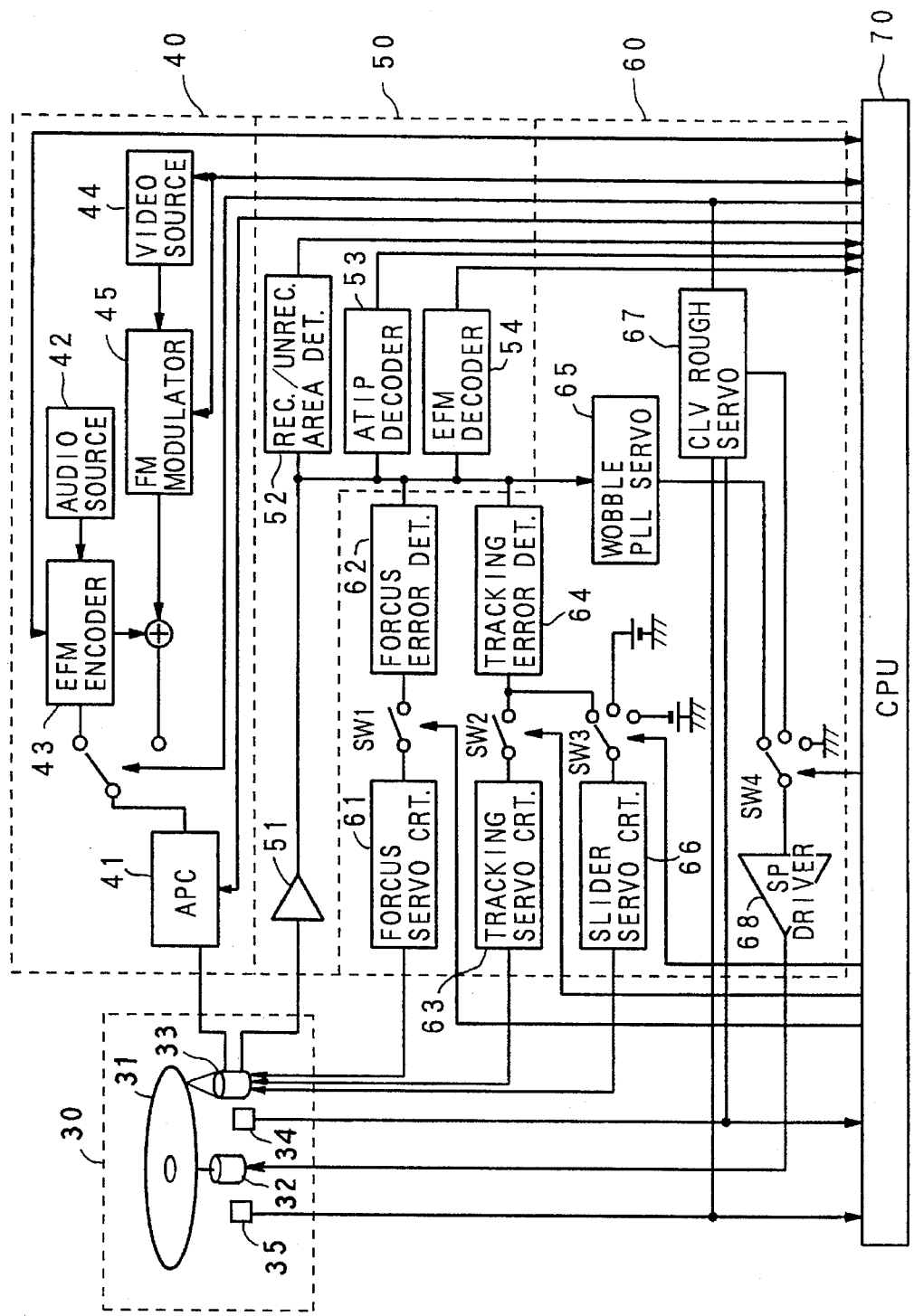
FIG. 5 is a block diagram illustrating a construction of a CD-R recording apparatus according to the present invention.

Next, description will be given which is directed to an apparatus for recording audio and video information according to CDV format onto the above-described CDV-R. FIG. 5 illustrates a construction of information recording apparatus according to an embodiment of the present invention. In FIG. 5, CDV-R recording apparatus roughly includes a disc reproducing system 30, a recording system 40, a signal processing system 50, a servo system 60 and a CPU 70. The disc reproducing system 30 includes a disc (CDV-R) 31 on which signal is recorded, a spindle motor 32 for rotating the disc, a pickup 33 for reading out signal recorded on the disc, a position sensor 34 for detecting position of the pickup 33 in the radial direction of the disc 31 and an oscillator (FG) 35 for generating signal corresponding to the rotation frequency of the disc 31. The recording system 40 includes an APC (Auto Power Control) circuit 41 for controlling recording power and reproducing power of the pickup 33, an audio source 42 for generating audio signal to be recorded, an EFM (Eight to Fourteen Modulation) encoder 43 for conducting EFM modulation onto the signal supplied from the audio source 42, a video source 44 for generating video signal to be recorded and an FM modulator 45 for conducting FM modulation onto the video signal supplied from the video source 44. The signal processing system 50 includes an RF amplifier 51 for amplifying RF signal read out by the pickup 33, a recorded/unrecorded area detecting circuit 52 for detecting recorded area and unrecorded area of the disc 31 based on the amplified RF signal, an ATIP decoder 53 for demodulating ATIP signal from wobble signal obtained from the amplified RF signal and an EFM decoder 54 for conducting EFM demodulation onto the RF signal. The servo system 60 includes a focus servo system, a tracking servo system, a slider servo system and a spindle servo system. The focus servo system includes a focus error detecting circuit 62, a switch SW1 and a focus servo circuit 61. The tracking servo system includes a tracking error detecting circuit 64, a switch SW2 and a tracking servo circuit 63. The slider servo system includes a switch SW3 and a slider servo circuit 66. The spindle servo system includes a wobble PLL servo circuit 65, a CLV rough servo circuit 67, a switch SW4 and a spindle driver 68. The CPU 70 is connected to the disc reproducing system 30, the recording system 40, the signal processing system 50 and the servo system 60, and performs total control of these systems.

Next, an operation of the CDV-R recording apparatus will be described. Firstly, basic operation of the servo systems will be described. When the disc 31 is placed at an appropriate position, the pickup 33 is transferred to the most inner circumference of the disc 31, and the focus servo system commences focus servo control. Accordingly, light spot of the light beam emitted from the pickup 33 becomes focused state. Then, rough servo control for spindle motor 32 is carried out. Namely, based on signal output from the FG 35 and positional information output from the position sensor 34, the CLV rough servo circuit 67 controls the spindle driver 68 to rotate the spindle motor 32. The position sensor 34 detects whether the pickup 33 is in the first area of the CDV-R disc 31 or in the second area thereof. The frequency of the output signal of the FG 35 is compared with a first reference frequency when the pickup 33 is in the first area, and is compared with a second reference frequency when the pickup 33 is in the second ares. The difference obtained in the comparison is operated as FG error signal. The first reference frequency corresponds to the linear velocity (1.2–1.4 m/s) in the first area of CDV while the second reference frequency corresponds to the linear velocity (11–12 m/s) in the second area of the CDV. The FG error signal indicates a difference between the reference frequency and the actual rotation frequency of the disc 31, and when the FG error signal is converged into zero, the rough servo becomes locked state. By the rough servo control described above, the spindle motor 32 rotates at the linear velocity corresponding to the first or second reference frequency.

Next, the tracking error detecting circuit 64 outputs tracking error signal based on the RF signal. The tracking servo circuit 63 makes the light beam follow the pregrooves on the recording surface of the CD-R on the basis of the tracking error signal. As has been described above, the pregroove on the recording surface of CD-R wobbles so that the center frequency of the wobbling becomes 22.05 kHz, and therefore a wobble signal is obtained from the pregroove. The wobble signal thus read is supplied to the ATIP decoder 53 and the wobble PLL servo circuit 65. Then, the switch SW4 is turned over from the CLV rough servo circuit side to the wobble PLL servo circuit side, and the wobble PLL servo is carried out so that the center frequency of wobbling becomes 22.05 kHz. When the wobble servo system is locked, the spindle motor 32 rotates so that the linear velocity becomes equal to the first or second linear velocity. In addition, the wobble signal includes FM-modulated ATIP information, and the ATIP decoder 53 supplies absolute time information and disc code information to the CPU 70.

Figure 6:
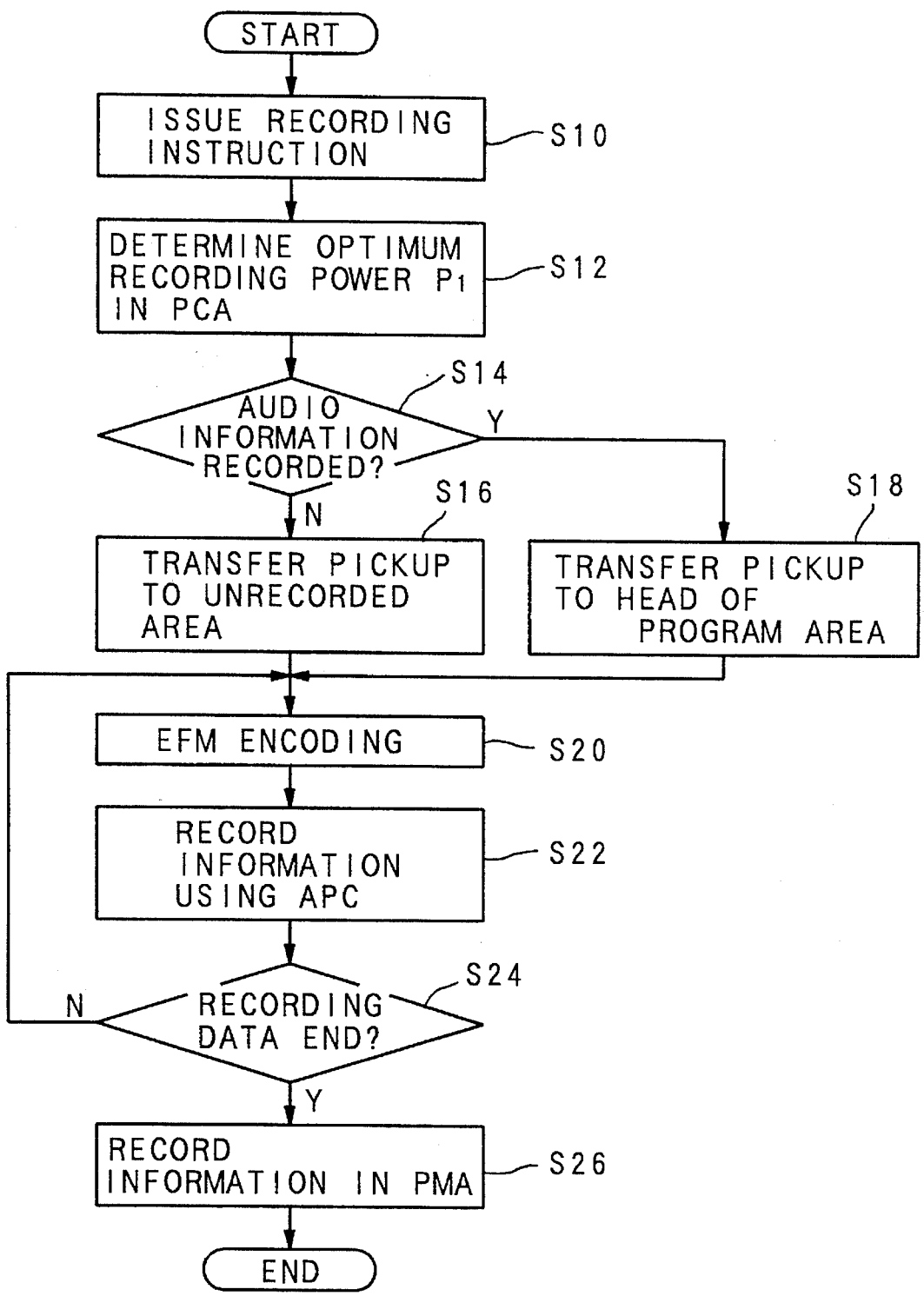
FIG. 6 is a flowchart showing operation of recording information on a first area of CDV-R.

Next, an operation of recording information onto the CDV-R disc according to the embodiment of the present invention will be described. Firstly, an operation of recording audio information onto the first area according to CD-format will be described with reference to FIG. 6.

When instruction to record audio information is issued by the CPU 70 (step S10), the pickup 33 is transferred to the PCA 2 provided at most inner circumference of the disc 31, and the optimum recording power $P_1$ is determined by the test recording performed there (step S12). Since the PCA 2 is located within the first area of CDV-R, the optimum recording power $P_1$ is determined under the condition where the disc 31 is rotated at the first linear velocity (1.2–1.4 m/s). In addition, recording of audio information onto the program area in the first area described below is carried out by the first linear velocity. Therefore, information is accurately recorded by the optimum recording power suitable for the linear velocity. It is noted that detailed description of determining the optimum recording power $P_1$ will be omitted here because it is a known technique disclosed in the above-mentioned Japanese Patent Application.

Next, the pickup 33 is transferred to the PMA 23 in the first area, and it is judged whether audio information has already been recorded on the disc 31 or not (step S14). Specifically, the recorded/unrecorded area detecting circuit 52 detects presence or absence of audio information recorded on the PMA 23 based on the read RF signal. If audio information has been recorded, the ATIP decoder 53 discriminates until when in the ATIP time audio information has been recorded. If it is judged in step S14 that audio information has already been recorded, the pickup 33 is transferred to a recordable area (beginning of the unrecorded area) in the program area 5 in the first area (step S16). Alternatively, if it is judged in step S14 that no information has been recorded, the pickup 33 is transferred to most inner circumferential area of the program area 5, that is, to a head portion of unrecorded area (step S18).

Next, the EFM encoder 43 conducts EFM encoding onto the audio signal output from the audio source 42 on the basis of the CD-format (step S20). The EFM pulse signal is transmitted to the APC circuit 41. The APC circuit 41 controls output of the optical pickup 33 on the basis of the EFM pulse signal to record information on the surface of the disc 31 (step S22). Subsequently, it is judged whether all of the audio signal is recorded or not. If any of the audio signal still remains unrecorded, operation of steps S20 to S22 is repeated (step S24). When all of the audio signal is recorded, information relating to the history of the recorded audio signal is recorded in the PMA 23 as EFM signal (step S26), and the recording operation is ended.

As described above, according to the present invention, audio signal is recorded on the first area of the CDV-R by the optimum recording power determined by the test recording utilizing the PCA 2 provided within the first area. As a result, the audio signal output from the audio source 42 is recorded in the program area 5 according to CD-format in conformity with the standard of CDV.

Figure 7:
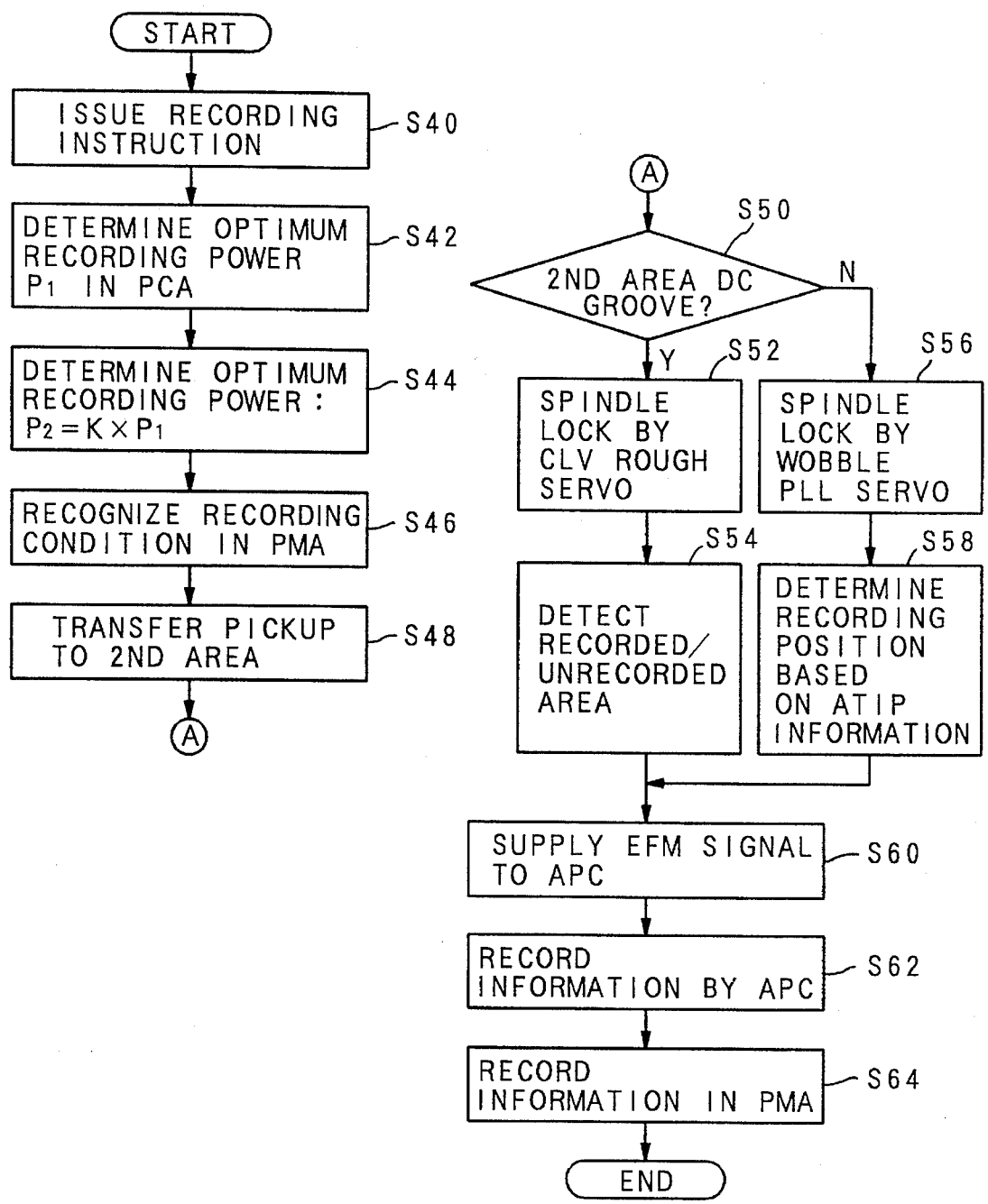
FIG. 7 is a flowchart showing operation of recording information on a second area of CDV-R.

Next, an operation of recording LD-format video signal and audio signal (hereinafter simply referred to as "video signal") on the second area of CDV-R will be described with reference to FIG. 7. When the CPU 70 issues instruction to record video information (step S40), the pickup 33 is transferred to the PCA 2 provided within the first area of CDV-R and optimum recording power is determined by the same operation as described above (step S42). If the optimum recording power $P_1$ has been determined for recording audio signal to the first area, this step may be omitted. Then, the optimum recording power $P_1$ is multiplied by the constant K determined by the above operation to determine the second optimum recording power $P_2$ used for recording in the second area (step S44). Then, the CPU 70 recognizes recording condition based on information recorded in the PMA 3 (step S46), and transfers the pickup 33 to the program area 5 within the second area (step S48).

Subsequently, the CPU 70 discriminates whether the groove in the program area 5 is DC groove or not (step S50).

If yes, the CPU 70 leads the spindle motor 32 to locked state using the CLV rough servo (step S52). If it is DC groove, no ATIP information is recorded. Therefore, the recorded/unrecorded area detecting circuit 52 discriminates recording condition and detects unrecorded area, and the CPU 70 transfers the pickup 33 to the unrecorded area thus detected (step S54). Alternatively, if it is judged in step S50 that the groove is not DC groove, the CPU 70 leads the spindle motor 32 to locked state using the wobble PLL servo (step S56), determines recording start position by referring to the ATIP information obtained from the RF signal, and transfers the pickup 33 to the recording start position thus determined (step S58).

Subsequently, the FM modulator 45 modulates the video signal supplied from the video source 44 by FM modulation in accordance with the LD-format, mixes the FM-modulated signal with the EFM signal supplied from the EFM encoder 43, and supplies the mixed signal to the APC circuit 41 (step S60). The APC circuit 41 controls the pickup 33 based on the signal thus input, and records video signal (step S62). When the recording of the video signal is completed, the CPU 70 transfers the pickup 33 to the PMA 23 to record information relating to the history of the video signal thus recorded, and ends the recording operation (step S64).

As described above, in the second area of CDV-R, information is recorded by the optimum recording power $P_2$ determined by multiplying the optimum recording power $P_1$ obtained using the PCA 2 within the first area by a predetermined constant. By this operation, video signal output from the video source 44 and audio signal output from the audio source 42 are recorded in the program area 5 within the second area of the CDV-R according to the LD-format which is in conformity with the standard of CDV.

When the audio signal is recorded in the first area and the video and audio signals are recorded in the second area, lead-in area and lead-out area are formed on the disc according to the CDV-format, and the disc is finalized. Details of the finalizing operation, forming lead-in area and lead-out area, etc. is disclosed in Japanese Patent Publication No. 5-22992. Since the finalized disc thus produced is in conformity with CDV-format, it can be reproduced by an ordinary CDV player or an optical disc player having CDV playback capability.

What is claimed is:

1. An apparatus for recording information on a recordable optical disc by applying a light beam on the surface thereof, said disc comprising a first recording area on which information is recorded and reproduced while the disc is rotated at a first linear velocity; and a second recording area on which information is recorded and reproduced while the disc is rotated at a second linear velocity, the first recording area comprising a test recording area, and said apparatus comprising recording power determining means for determining first optimum recording power for recording information on the first area by a test recording utilizing the test recording area, and for determining second optimum recording power for recording information on the second area by multiplying a first optimum recording power by the predetermined constant, wherein the constant is calculated on the basis of a ratio of the first linear velocity and the second linear velocity.

2. An apparatus according to claims 1, wherein the first recording area is located inner circumferential side of the disc and the second recording area is located in the outer circumferential side of the disc.

3. An apparatus according to claim 1, further comprising means for recording audio information according to format of Compact Disc in the first recording area and recording audio and video information according to recording format of Laser Disc in the second area.

4. A method of recording information on a recordable optical disc by applying a light beam on the surface thereof, said disc comprising a first recording area and a second recording area, the first recording area comprising a test recording area, said method comprising the steps of:

rotating the disc at first linear velocity and determining a first optimum recording power for recording information on the first area by a test recording utilizing the test recording area;

recording information on the first recording area by the first optimum recording power while the disc is rotated at the first linear velocity;

determining second optimum recording power for recording information on the second area by multiplying the first optimum recording power by a predetermined constant; and recording information on the second recording area by the second optimum recording power while the disc is rotated at the second linear velocity, wherein the constant is calculated on the basis of a ratio of the first linear velocity and the second linear velocity.

5. An apparatus according to claim 1, wherein said predetermined constant is determined in accordance with the first linear velocity and the second linear velocity.

6. A method according to claim 4, wherein said predetermined constant is determined in accordance with the first linear velocity and the second linear velocity.

* * * * *